(12) United States Patent
Seaman et al.

(10) Patent No.: US 6,212,676 B1
(45) Date of Patent: *Apr. 3, 2001

(54) EVENT ARCHITECTURE FOR SYSTEM MANAGEMENT IN AN OPERATING SYSTEM

(75) Inventors: Michael R. C. Seaman, Kirkland; Kevin W. Ross, Duvall; Mark S. Blanford, Redmond; Isaac J. Heizer, Woodinville; Daniel E. F. Plastina, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/307,492

(22) Filed: May 7, 1999

Related U.S. Application Data

(63) Continuation of application No. 08/143,870, filed on Oct. 27, 1993, now abandoned, and a continuation of application No. 08/450,259, filed on May 25, 1995, now Pat. No. 5,905,890.

(51) Int. Cl.[7] ................................................. G06F 9/445
(52) U.S. Cl. .................. 717/4; 717/1; 717/2; 717/5; 717/11; 709/315; 709/318
(58) Field of Search .................. 717/1, 2, 4, 5, 717/11; 709/315, 318

(56) References Cited

U.S. PATENT DOCUMENTS

| | | |
|---|---|---|
| 4,866,638 | 9/1989 | Cosentino et al. . |
| 5,155,842 * | 10/1992 | Rubin .................................... 714/22 |
| 5,321,838 | 6/1994 | Hensley et al. . |
| 5,333,302 | 7/1994 | Hensley et al. . |
| 5,355,484 | 10/1994 | Record et al. . |
| 5,517,655 | 5/1996 | Collins et al. . |
| 5,551,035 | 8/1996 | Arnold et al. . |
| 5,566,337 | 10/1996 | Szymanski et al. . |
| 5,581,760 | 12/1996 | Atkinson et al. . |
| 5,692,157 | 11/1997 | Williams . |
| 5,794,005 * | 8/1998 | Steinman ........................ 395/500.38 |
| 5,822,583 * | 10/1998 | Tabuchi ............................... 709/100 |
| 5,838,969 * | 11/1998 | Jacklin et al. ....................... 709/300 |

(List continued on next page.)

FOREIGN PATENT DOCUMENTS

WO91/03017  3/1991  (WO) .

OTHER PUBLICATIONS

Richner et al., "Architecture of an MMS Event Manager", IEEE, pp. 439–444, 1993.*

IBM, "Event Handlers For An Object–Oriented Officevision," *IBM Technical Disclosure Bulletin*, 34:No. 4A (Sep. 1991).

Microsoft Corporation, *Microsoft Visual Basic Control Development Guide,* Chapter 2, "Fundamental Concepts," pp. 7–14; Chapter 8, "Adding Custom Events," pp. 57–63 (1992).

(List continued on next page.)

*Primary Examiner*—Kakali Chaki
*Assistant Examiner*—Ted T. Vo
(74) *Attorney, Agent, or Firm*—Christensen O'Connor Johnson Kindness PLLC (57) ABSTRACT

An event system is provided within an object-oriented environment. The event system informs users and system functions of events within the system. Events may be modeled as objects that are visible within the global namespace. These objects include event source objects and event sink objects. Event source objects generate event reports and event sink objects are the objects that receive reports. Special objects may be incorporated in the system to direct event reports from an event source object to an event sink object.

11 Claims, 11 Drawing Sheets

U.S. PATENT DOCUMENTS

| | | | | |
|---|---|---|---|---|
| 5,905,890 | * | 5/1999 | Seaman et al. | 717/4 |
| 5,925,108 | * | 7/1999 | Johnson et al. | 709/318 |
| 5,987,423 | * | 11/1999 | Arnold et al. | 705/14 |
| 6,104,963 | * | 8/2000 | Cebasek et al. | 700/86 |

OTHER PUBLICATIONS

Masoni, A., et al., "Performances of the Obelix Event Builder and Producer," *IEEE* (1993).

Microsoft Press, Chapter 1, "Windows and Programming," pp. 1–23; Chapter 5, "The Mouse," pp. 169–171, *Programming Windows* (1988).

Heller, D., "The XView Toolkit," *UnixWorld,* VII:No. 6, pp. 127–138 (Jun. 1990).

Heller, D., "The XView Notifier," *UnixWorld,* VII:No. 7, pp. 123–133 (Jul. 1990).

* cited by examiner

EVENT ARCHITECTURE FOR SYSTEM MANAGEMENT IN AN OPERATING SYSTEM

CROSS-REFERENCE TO RELATED APPLICATION

This application is a continuation of U.S. patent application Ser. No. 08/450,259, filed May 25, 1995, which issued as U.S. Pat. No. 5,905,890 on May 18, 1999, which is a continuation of U.S. patent application Ser. No. 08/143,870, filed Oct. 27, 1993, now abandoned.

TECHNICAL FIELD

The present invention relates generally to data processing systems and, more particularly, to an event system for reporting system management events in a data processing system.

BACKGROUND OF THE INVENTION

Many distributed operating systems have difficulty in monitoring events. In particular, these operating systems have difficulty determining where events occur and obtaining useful information about the events. Such systems do not provide a convenient architecture for raising and sending events.

SUMMARY OF THE INVENTION

In accordance with an aspect of the present invention, a method is practiced in a data processing system in which a global namespace of objects is provided and stored in the memory means. Event source objects are provided for generating event report objects in response to events at the event source objects. An event sink object is provided for receiving event report objects and a distributor object is also provided for distributing event report objects from the event source objects to the event sink objects. The event source objects, the event sink object, the distributor object and the event report objects are all visible in the global namespace. An event is triggered at one of the event source objects and an event report is generated in response to the event. The event report is generated at the event source object where the event was triggered. The event report object is forwarded to the distributor object. The distributor object forwards the event report object to the event sink object to inform the event sink object of the triggered event. The distributor object may be provided with a filter that is examined to determine where the report object should be forwarded.

In accordance with an additional aspect of the present invention, a plurality of event source objects are provided along with a plurality of event sink objects and a distributor object. The event sink objects are registered with the distributor object to be informed of events at the event source objects. Event report objects are generated at the event source objects in response to events. The event report objects are forwarded to the distributor object, and the distributor object determines which event sink object should receive the event report objects. Once this determination is made, the event report objects are forwarded to the determined event sink objects.

In accordance with a further aspect of the present invention, a method is practiced in a data processing system having a storage device. In this method an event source object is stored in the storage device. The event source object then raises events and generates event reports that report the generated events. Event sink objects are also stored in the storage device. An event source holder object is stored in the storage device. The event source holder object maintains a register of registrations by event source objects that are registered to receive an event report upon occurrence of an event at the event source object. An event is triggered at the event source object, and event reports are sent to event sink objects that are registered with the event source holder object.

In accordance with a still further aspect of the present invention, a method is practiced wherein an event source object is stored in the storage device. The event source object is capable of raising a set of events. Type information is stored about the event source object in the storage device. The type information specifies the set of events that the event source object may raise.

In accordance with a further aspect of the present invention, a method is practiced wherein at least one event source object is provided in the memory means for generating an event report in response to an event at the event source object. In addition, a first distributor object and a second distributor object are provided in the memory means. The first distributor object serves to distribute the event report when generated by the event source object to the second distributor object. An event is triggered at the event source object and the event report is generated at the event source object. The event report is forwarded to the first distributor object. Filtering information is provided from the second distributor object to the first distributor object. The filtering information specifies a type of event report that the second distributor object wishes to receive. Where the filtering information indicates that the second distributor object wishes to receive the event report, the event report is forwarded from the first distributor object to the second distributor object.

In accordance with a further aspect of the present invention, a method is practiced wherein an event source object for generating an event report in response to an event is provided along with an event sink object for receiving the event report. In this method, the event sink object is registered to receive the event report from the event source object. As part of the registration, an instance of a function in an interface to be called by the event report as received by the event sink object is specified.

DETAILED DESCRIPTION OF THE INVENTION

A preferred embodiment of the present invention provides an event system architecture for generating system management events. The architecture is designed to be easily used and to require minimal overhead. The system management events notify processes of certain states.

Figure 1:
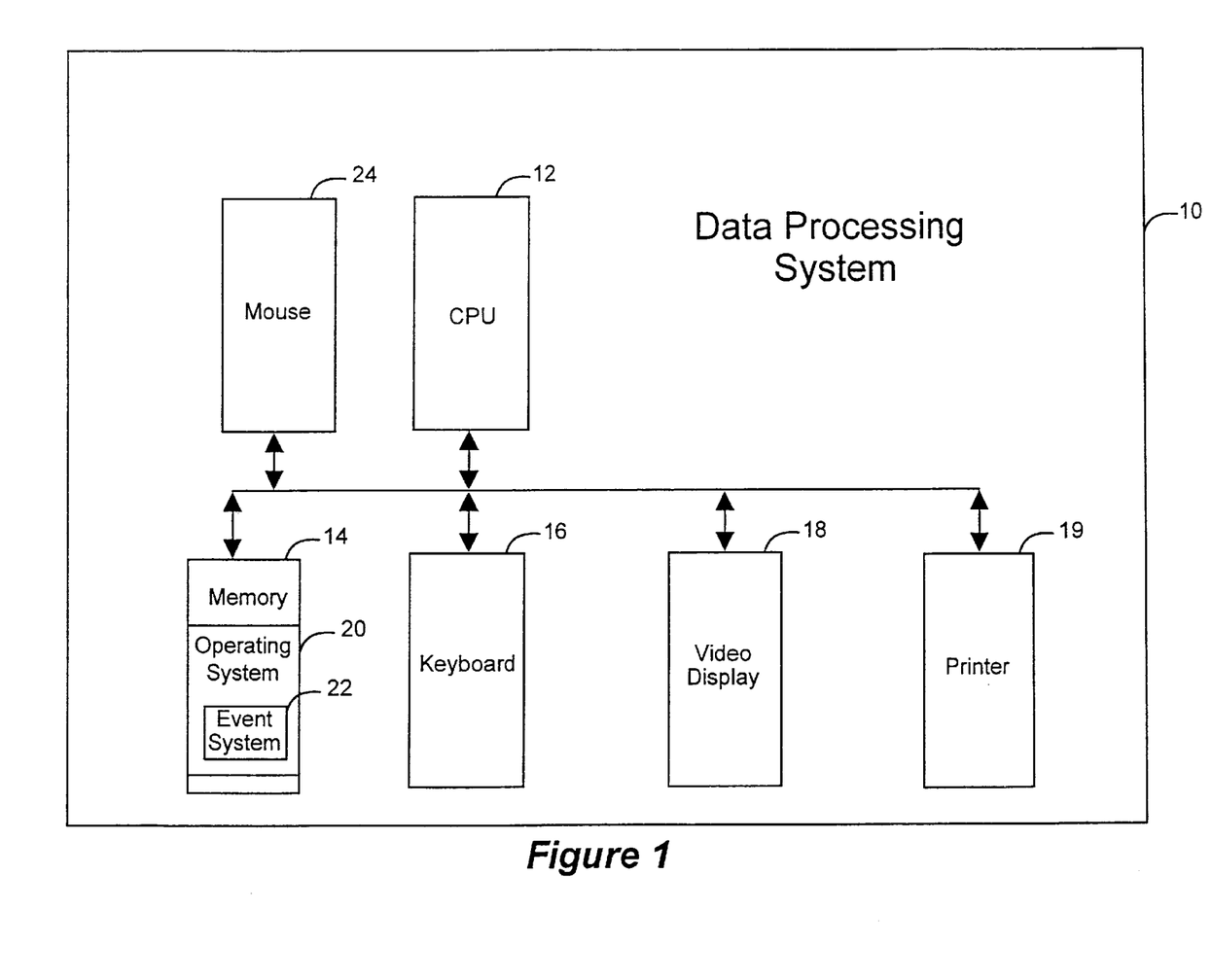
FIG. 1 is a block diagram of a data processing system that is suitable for practicing a preferred embodiment of the present invention.

FIG. 1 shows an illustrative data processing system 10 for practicing a preferred embodiment of the present invention. Those skilled in the art will appreciate that other types of data processing systems may be used for practicing the present invention. The data processing system 10 includes a central processing unit (CPU) 12 that oversees activities of the system. The CPU 12 communicates with a memory 14, a keyboard 16, a video display 18, a printer 19 and a mouse 24. The memory 14 holds an object-oriented operating system 20 that includes an event system 22. Although the operating system 20 of the preferred embodiment is an object-oriented operating system, those skilled in the art will appreciate that the present invention is not limited to such an object-oriented environment. The keyboard 16 and mouse 24 are conventional input devices, and the video display 18 and printer 19 are conventional output devices.

The event system 22 is responsible for overseeing the generation and transmission of event reports that report the occurrence of particular events in the system 10. An "event," in this context, is an asynchronously arising condition relative to a destination process that wishes to be informed of the event. The process in which the condition arises is the "event source," whereas the process to which the event is reported is the "event sink." An "event report" reports an event and is transmitted from the event source to the event sink (as will be described in more detail below). The event source and event sink are objects that are visible in a distributed namespace of the system 10. The distributed namespace is a logical organization of the "names of objects" (described in more detail below) that are stored in the system 10.

The preferred embodiment of the present invention allows application programs run on the system 10 (FIG. 1) to generate and receive information about external events without possessing knowledge about the events or the sources of the events. It provides a means for an event sink 27 (FIG. 2A) to register with an event source 23 to receive an event report 25. The event sink 27 may then invoke an event handler to respond to the occurrence of the event. The design of the preferred embodiment leverages the distributed namespace of the system to provide places for event sinks to register. The preferred embodiment also provides a means to send the event report from the event source to the event sink.

Figure 2A:
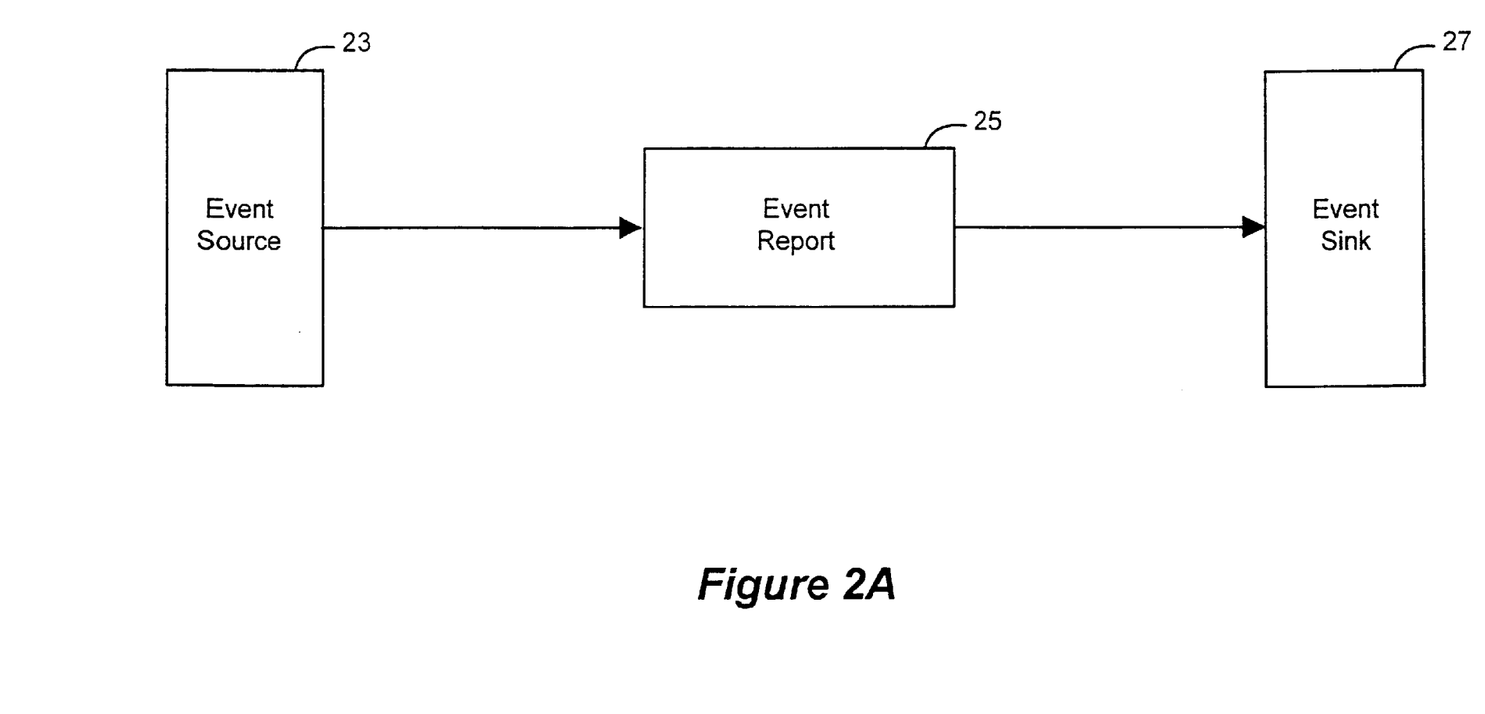
FIG. 2A is a block diagram illustrating an instance of the preferred embodiment in which a single event report is sent from a single event source to a single event sink.
Figure 2B:
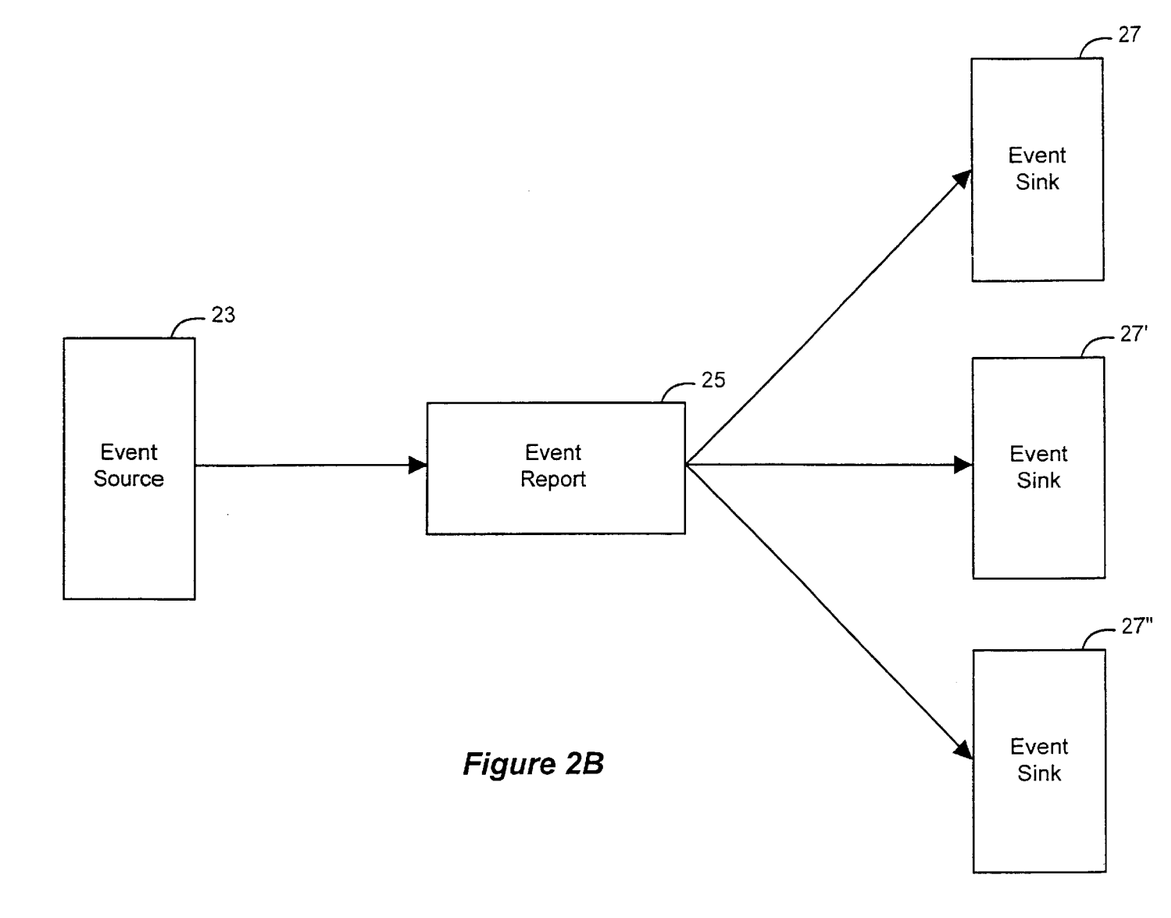
FIG. 2B is a block diagram illustrating an instance of the preferred embodiment in which a single event report is sent from a single event source to multiple event sinks.
Figure 2C:
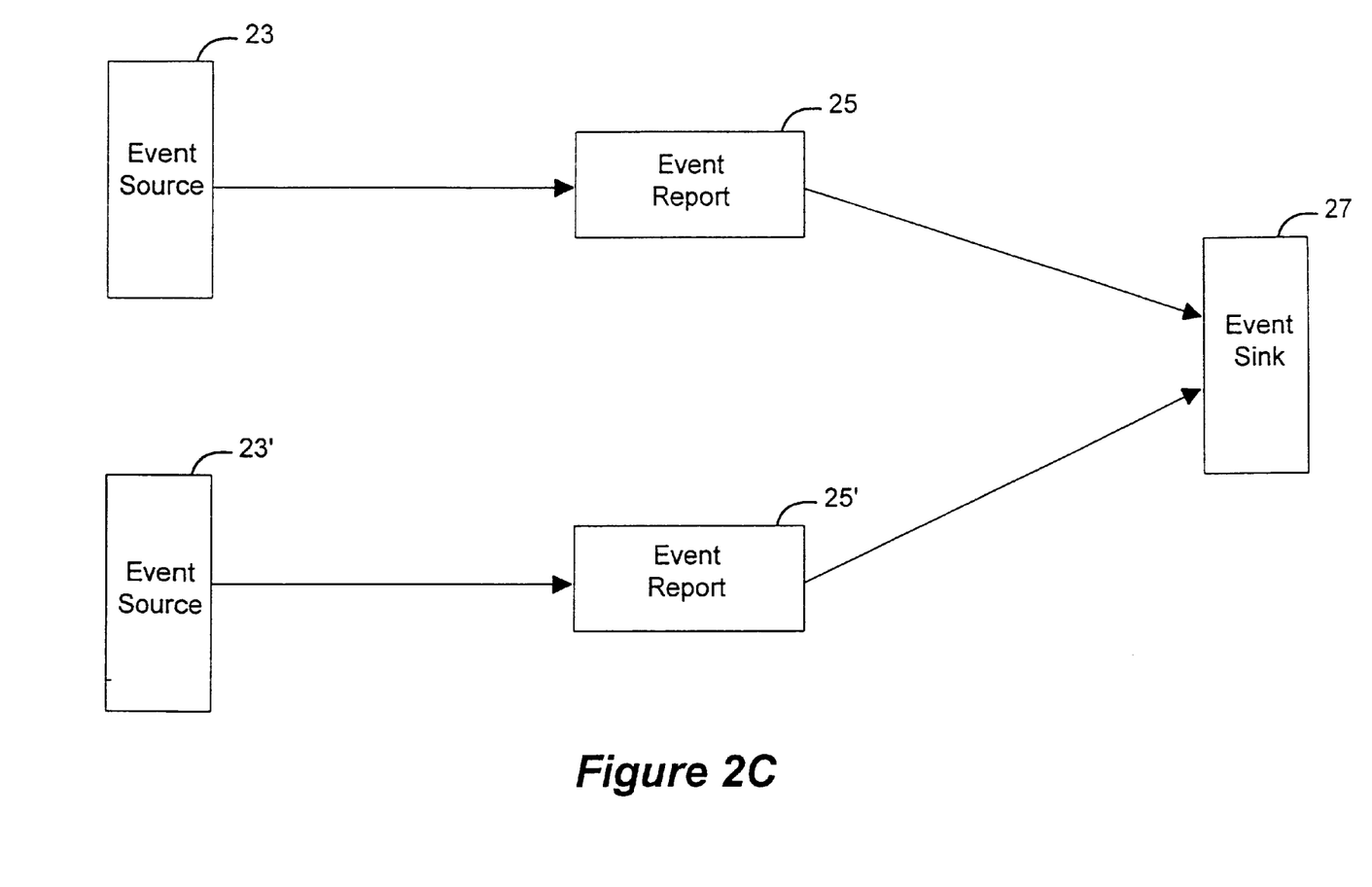
FIG. 2C is a block diagram illustrating an instance of the preferred embodiment in which multiple event sources send multiple event reports to a single event sink.
Figure 2D:
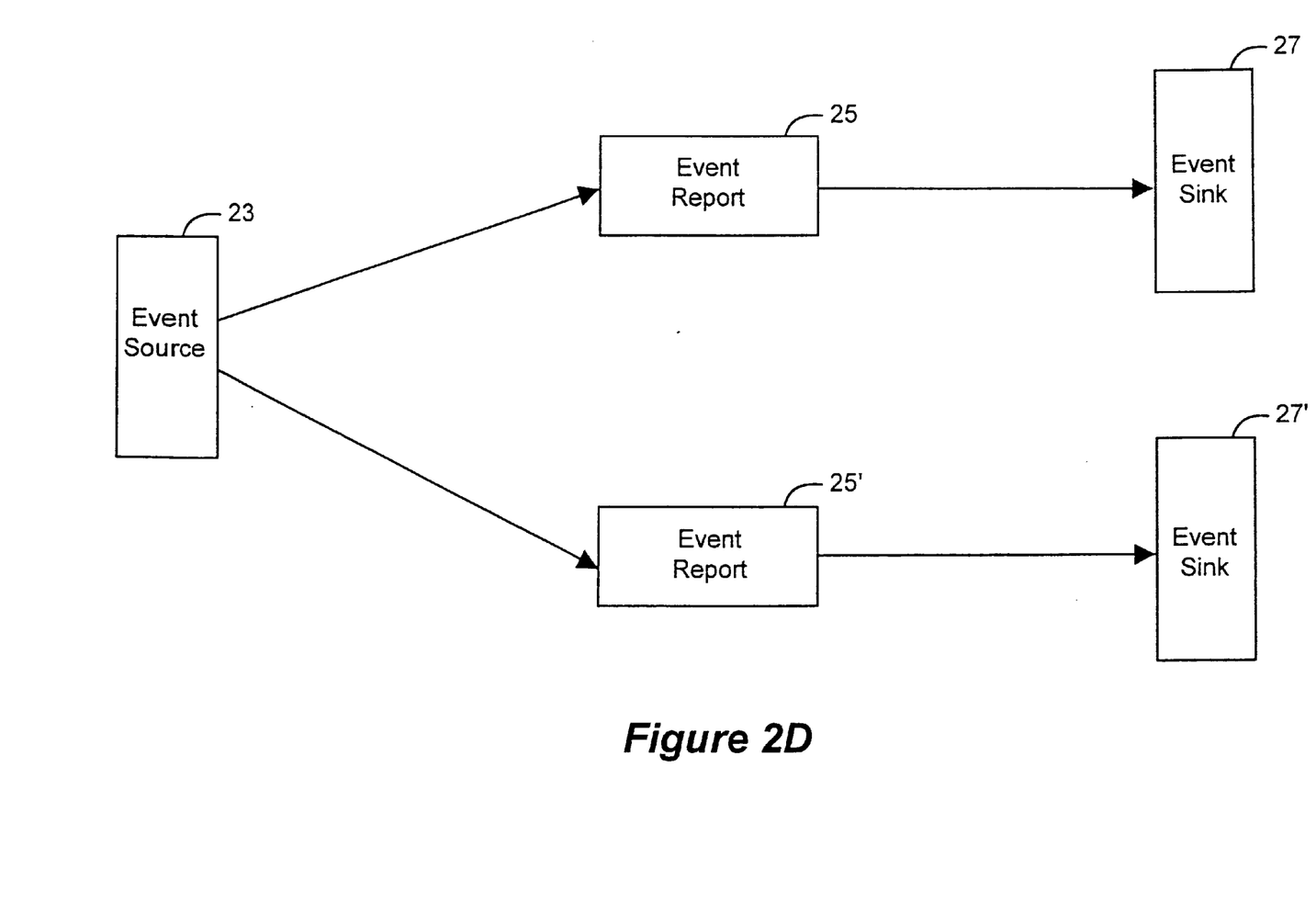
FIG. 2D is a block diagram illustrating an instance of the preferred embodiment in which a single event source sends multiple event reports to multiple event sinks.

It should be noted that an event report 25 need not be generated from a single event source 23 for transmission to a single event sink 27 as shown in FIG. 2A. In many instances, a single event report 25 may be sent from a single event source 23 to multiple event sinks 27, 27' or 27", as shown in FIG. 2B. Moreover, a single event sink 27 may receive different event reports 25 and 25' from different event sources 23 and 23', respectively, as shown in FIG. 2C. Still further, a single event source 23 may generate different event reports 25 and 25' (FIG. 2D) that are destined to different event sinks 27 and 27', respectively. In general, an event source may generate multiple or single event reports that are destined to one or many event sinks.

In order to understand how the preferred embodiment of the present invention operates, it is necessary to first understand certain programming concepts that are employed therein. One of the concepts employed by the preferred embodiment of the present invention is the notion of an "object." An "object" is an entity that may be a combination of two things: data that specifies an internal state of the object and functions that act upon the data.

The preferred embodiment of the present invention is designed for use in the object-oriented operating system 20 (FIG. 1). The operating system 20 supports an underlying object model. As such, many components in the system are modeled as objects. For example, event sources 23 (FIG. 2a) and event sinks 27 are modeled as objects. Event reports may be objects having properties. Other objects of interest will be described in more detail below. All of these objects are visible in the distributed namespace and thus their properties are easily accessible.

A closely related concept is the concept of an "interface." An "interface" is a group of semantically related functions that are organized into a named unit (the name being the identifier of the interface). Interfaces, by definition, have no instantiation (i.e., a definition of an interface does not include code for implementing the functions that are identified in the interface); rather, interfaces specify a set of signatures for functions. "Instantiation" refers to the process of creating in-memory structures that represent an object so that operations can be invoked on the object. When an object "supports" an interface, the object provides code for the functions specified by the interface. Thus, the object that supports the interface is responsible for providing the code for implementing the functions of the interface. The code that is provided must comply with the signatures of the functions specified by the interface (i.e., the code must have the same parameters and functionality as are specified in the interface). Accordingly, an interface may be viewed as a standard with which objects must comply.

Interfaces support extensibility by allowing new interfaces to be developed in a fashion that does not affect existing applications. Interfaces are also consistent with the client/server model that is adopted by the operating system 20. In particular, interfaces are used to provide services to a client object. A server object is defined to support the interface, and the interface defines the functions that provide the services of the server object. For instance, the event source 23 (FIG. 2a) may be viewed as a server object, and the event sink 27 may be viewed as a client object.

Figure 3:
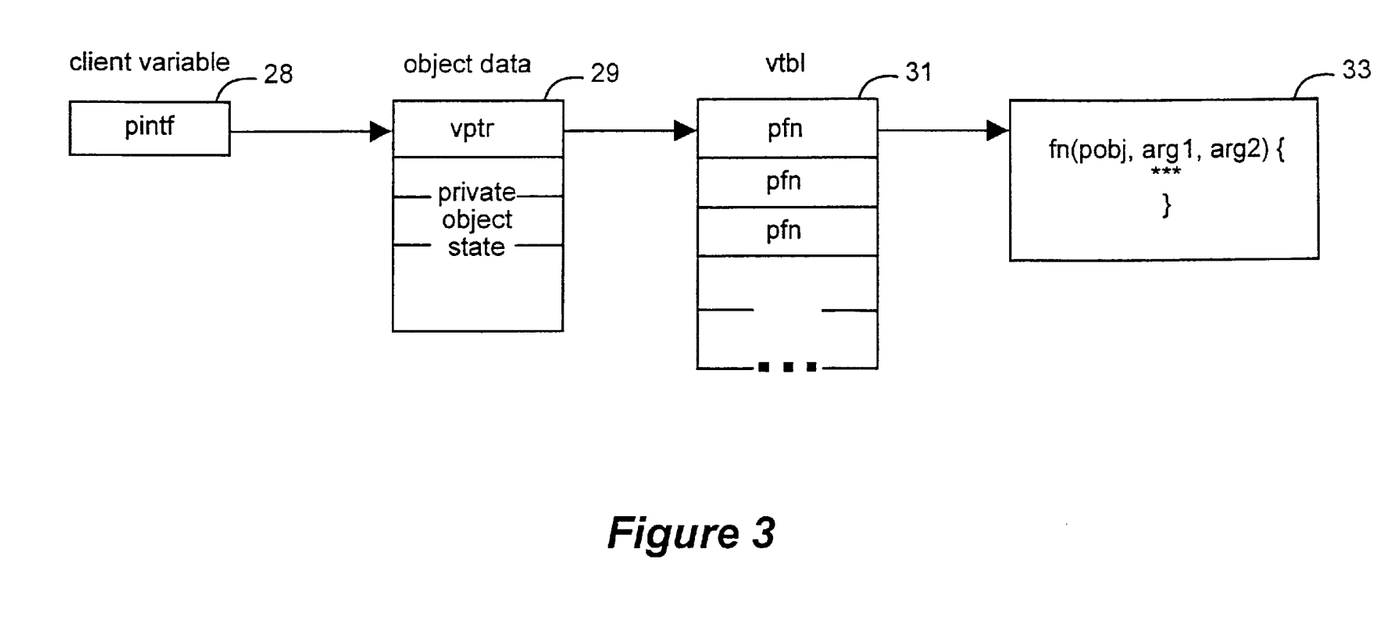
FIG. 3 is a diagram of the run time data structures used for interfaces by the preferred embodiment to the present invention.

The run time manifestation of an interface instance is a data structure that provides access to the functions defined for the interface. Interface instances are referenced by clients using pointers. As shown in FIG. 3, an interface pointer 28 points to an entry in the object data 29 of the object that supports the instance of the interface. In particular, the interface pointer points to an entry in the object data 29 that holds a pointer to a virtual table (i.e., a viable, such as commonly used in C++ programming). The viable 31 holds a series of pointers to instances of functions 33 that are supported by the object. Pointers to the functions included in the interface are among those provided in the viable 31.

Each object in the distributed namespace 28, by definition, must support the Unknown interface (i.e., all objects support interfaces that inherit the IUnknown interface). The IUnknown interface is a standardized interface provided by the operating system that includes a function, QueryInterface( ), for querying whether an object supports a particular interface. The QueryInterface( ) function returns a pointer to an instance of an interface that is specified in the parameters of the function. In general, whenever a function is called that is part of an instance of an interface, the QueryInterface( ) function must first be called.

An interface pointer, such as returned by the QueryInterface( ) function, may serve as a connection between an object and a client. It is difficult, however, for external entities to discover interface pointers that an object has dispensed, and it is difficult for external entities to discover interface pointers to other object objects that an object holds. To overcome these difficulties, the operating system 20 provides software connectors. Software connectors are standardized interfaces for connecting objects together and for advertising the interfaces of an object that are accessible by events. In general, a connection between objects in the preferred embodiment of the present invention is realized by passing an interface pointer from one object directly to another object in order to establish a meaningful connection between the objects. Both objects must share at least one connecting interface. Software connectors are utilized in the preferred embodiment of the present invention to establish connections between an event source and an event sink. This process will be described below as "registration".

Before discussing how an event sink registers with an event source to receive event reports, it is helpful to consider how events are defined relative to the objects that may generate them. In general, an object specifies an event set of events that it is capable of generating. The event set is part of the object's definition and is described in type information provided for the object. The type information may be stored in a storage structure that is separate from the object. The type information specifies which events are provided in the objects of that set. Consider as an example as object that supports an event set known as the DisKEventSet.

This event set is identified as follows:

```
eventset DiskEventSet
{
    DiskSpaceLow(DiskSpaceEvent psEvent);
    DiskFull(DiskSpaceEvent psEvent);
    DiskError(DiskErrorEvent psEvent)
}
```

DiskSpaceEvent is a property set that may be defined as follows:

```
propset DiskSpaceEvent : public DiskEvent
    {
        LARGE_INTEGER    DiskSpaceAvailable;
        LARGE_INTEGER    TotalDiskSpace;
    }
propset DiskEvent : public ISystemEvent
    {
        ULONG        UlVolumeID;
```

```
                    -continued

WCHAR *          pwzVolumeName;
    }
propset ISystemEvent
    {
    mandatory:
        SYSTIME          timeEventCreationTime;
        UUID             uuidClassId;
        ULONG            sevSeverity;
        UUID             uuidCategoryID;
        ULONG            ulEventCode;
        ULONG            ulHopCount;
    }
```

Figure 4:
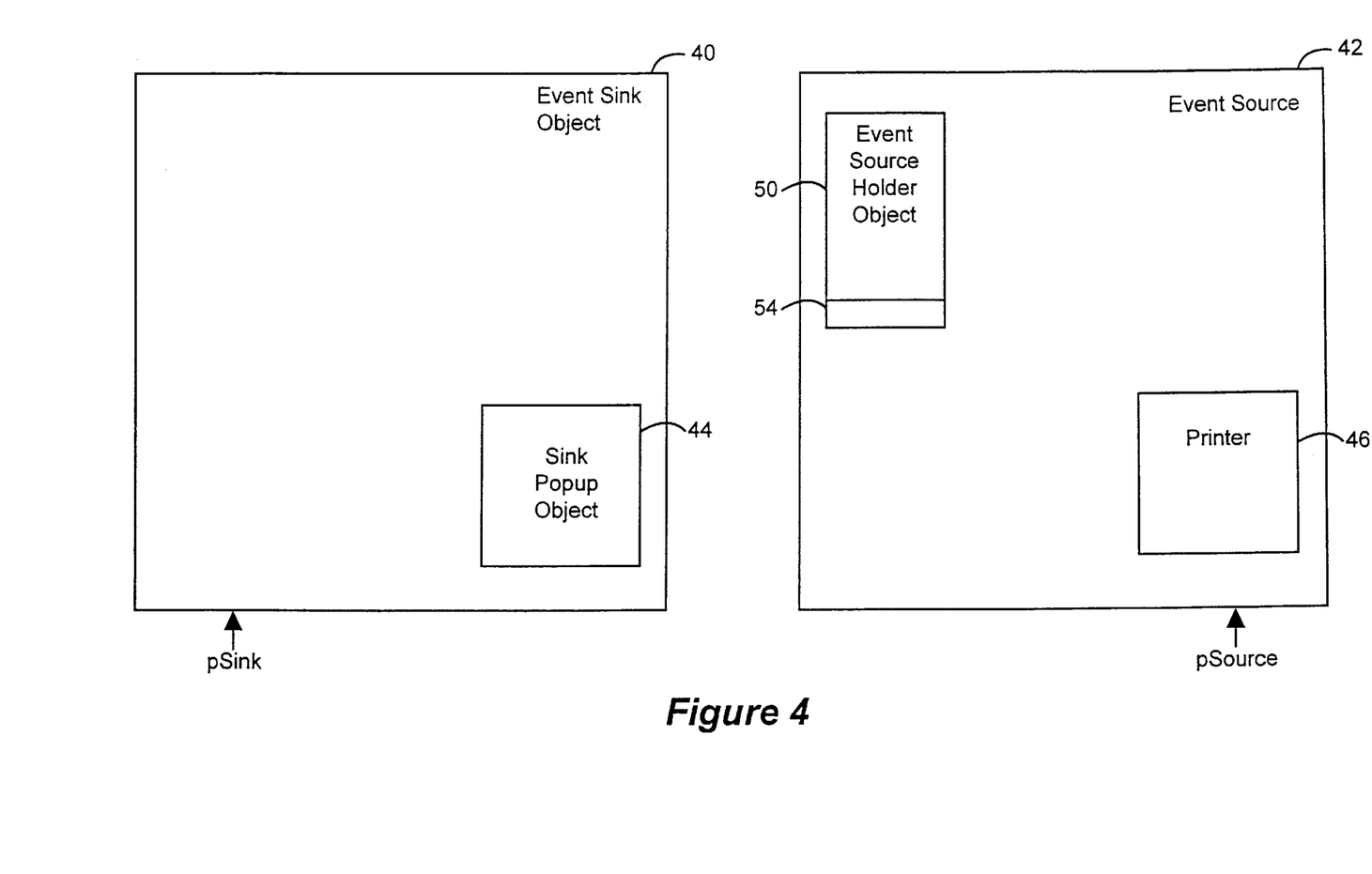
FIG. 4 is a diagram of objects that play a role in the preferred embodiment of the present invention to register an event sink object with an event source object to receive event reports.

Before discussing the registration process in more detail, it is useful to first introduce the objects which play a role within this registration process. FIG. 4 is a diagram illustrating an example situation wherein the objects that play a role in registration are used. FIG. 4 illustrates an instance wherein a printer 46 generates an event report that it is jammed and forwards this event report to a sink pop-up object 44 that generates a pop-up message on the video display 18 (FIG. 1) that is viewed by the user. As discussed above, an event source object 42 is an object which generates event reports. The event source object 42 supports the IConnectionContainer interface which is a standardized interface having functions for storing a connector in a container object. An event source holder object 50 is an object that maintains a list of registered event sinks for an event source object. The event source holder object 50 is responsible for the multi-casting of event reports to each registered event sink object. In the example of FIG. 4, the event source holder object 50 includes a list of all event sinks that are registered to receive event reports from the printer 46. An event source interface holder 54 object is an object that is a connection object (i.e., it holds an interface pointer to an event sink object) and holds the state associated with the connection to the event sink object. In FIG. 4, the event source interface holder object 50 holds a single event sink registration (i.e., it holds one entry from the register of event sink objects).

Figure 5:
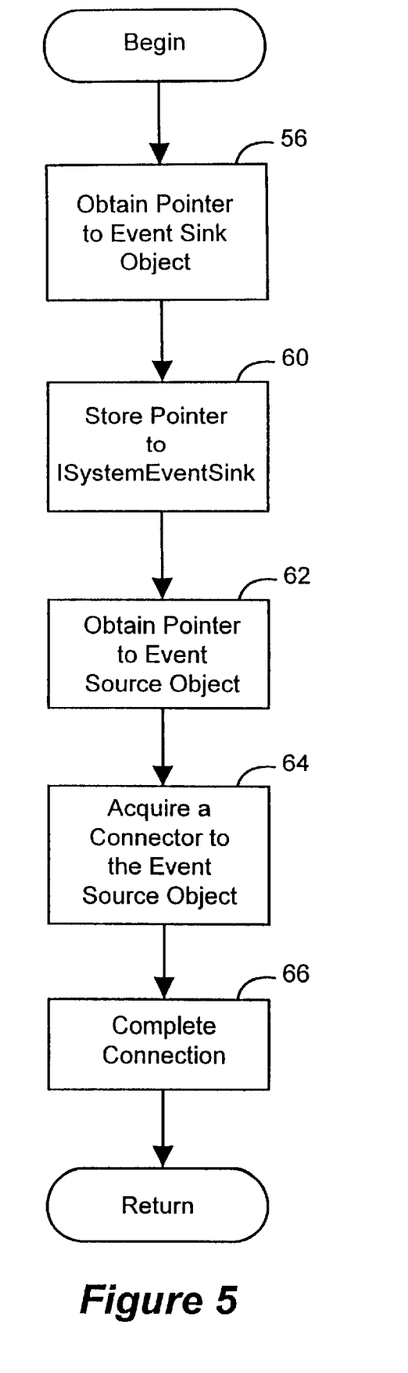
FIG. 5 is a flowchart illustrating the steps performed by the preferred embodiment to register an event sink object with an event source object to receive event reports.

FIG. 5 is a flowchart of the steps performed to obtain a registration of an event sink object so that it receives event reports from an event source. C++ code for implementing these steps in a separate connection tool is as follows:

pconSink→QueryInterface(IID_ISystemEventSink, &pesnkSink);
//Setup the source side of the registration
pSource→Queryinterface(IID_IConnectionContainer, &piccSource);
piccSource→NewConnection(IID_IEventSet, &pconSource);
//Actually perform the connection.
pconSource→Connect(pesnkSink, IID_ISystemEventSink, CONNECTFLAGS_PERSIST)

Initially, a pointer to the event sink object (i.e., "pSink" in FIG. 4) is obtained (step 56 in FIG. 5). Next, a pointer to the event source object is obtained (step 62 in FIG. 5). Specifically, the QueryInterface( ) function is called in the second instruction in the above code segment to determine whether the event source object 42 (pointed to by "pSource" in FIG. 4) supports the IConnectionContainer interface and stores the resulting pointer to the instance of IConnectionContainer interface in "piccSource". A connector to the event source object (i.e., a pointer to an interface that facilitates a connection to the object) is then acquired (step 64 in FIG. 5). The call to the NewConnection method provided within the IConnectionContainer interface of the event source object is used to store the connector in "pconSource".

The connect function is then called to create a connection (step 66 in FIG. 5). In the code segment given above, the connect function within the ISystemEventSink interface supported by the event sink object 40 is called to connect the event sink object 40 to the event source object 42.

An event report in the preferred embodiment of the present invention is largely represented as an array of variants. A variant is a data structure that can hold any fundamental data type, including character data, integer data and floating point data. Property sets that contain context information describing an event are loaded into the variants. This array of variants is passed as an event report type. Each event report may be encapsulated into an event report object that is persistently stored and visible within the distributed namespace. One of the properties held within the variant array is a class I.D. The class I.D. may be utilized to manufacture an event report object.

Figure 6:
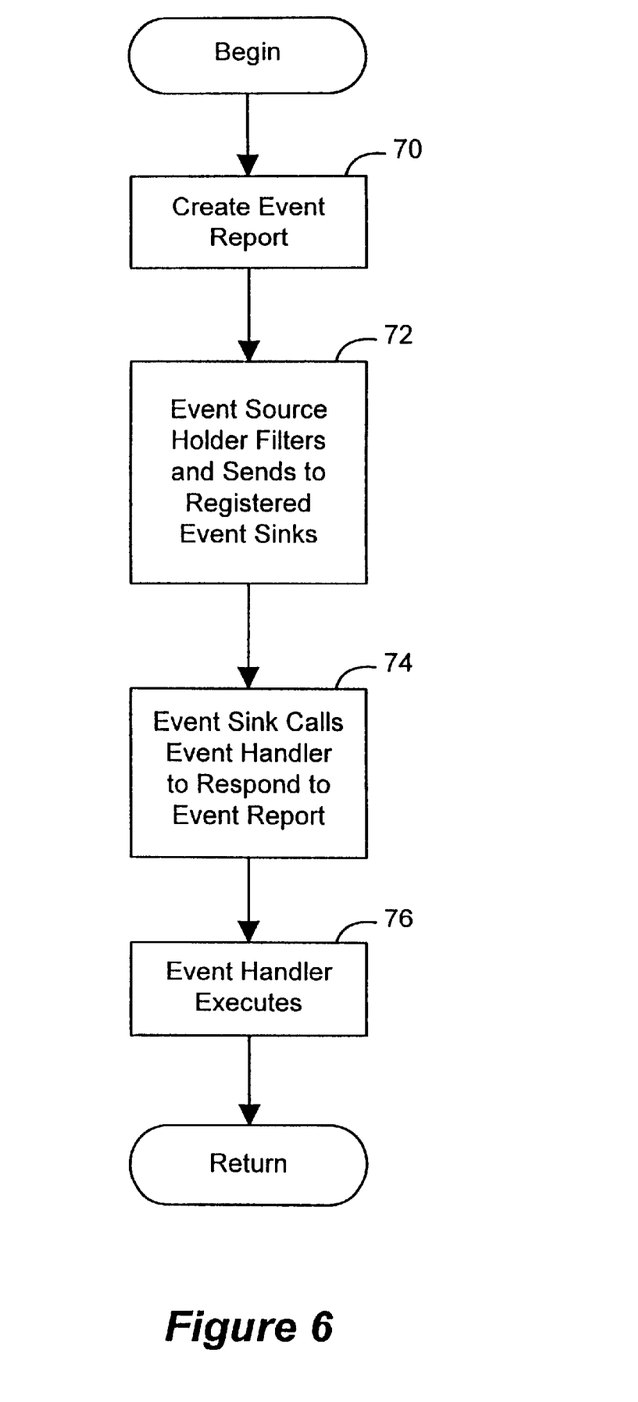
FIG. 6 is a flowchart illustrating steps performed by the preferred embodiment of the present invention in generating and processing event reports.

FIG. 6 is a high level flow chart of the steps performed to pass an event report from an event source object to event sink objects. Initially the event report is created by the event source object (step 70). The event source holder filters the output of the event report using the register stored therein and sends the report to the registered event sinks (step 72). The event sink receives the event report and calls an event handler to respond to the event report (step 74). The event handler then executes (step 78). The event handler may generate activity in response to the event report or may simply ignore the event report. A wide variety of options as to how to respond to an event report are available to an event handler.

Figure 7:
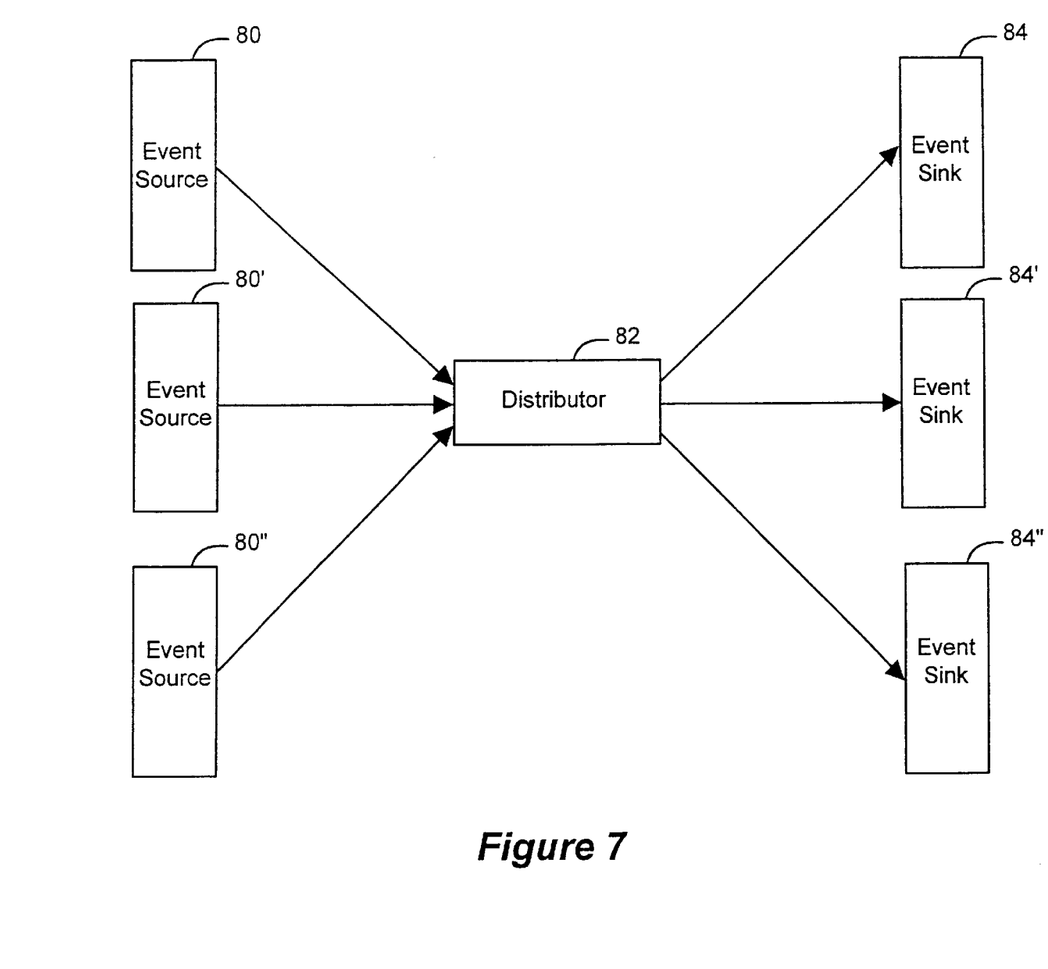
FIG. 7 is a block diagram of a preferred embodiment of the present invention when a distributor object is employed.

A system may also include special objects, known as "distributor objects." A distributor object is an object which exists in the global namespace to route event reports to event sinks. FIG. 7 depicts a distributor object 82 that receives event reports from event sources 80, 80' and 80". The distributor object 82 provides both event source and event sink functionalities. The distributor object 82 routes the event reports received from the event sources 80, 80' and 80" to event sinks 84, 84' and 84". Distributor objects 82 are useful in grouping event sources and sinks as sets. For example, a distributor may be used to represent all administrators on a given domain.

Figure 8:
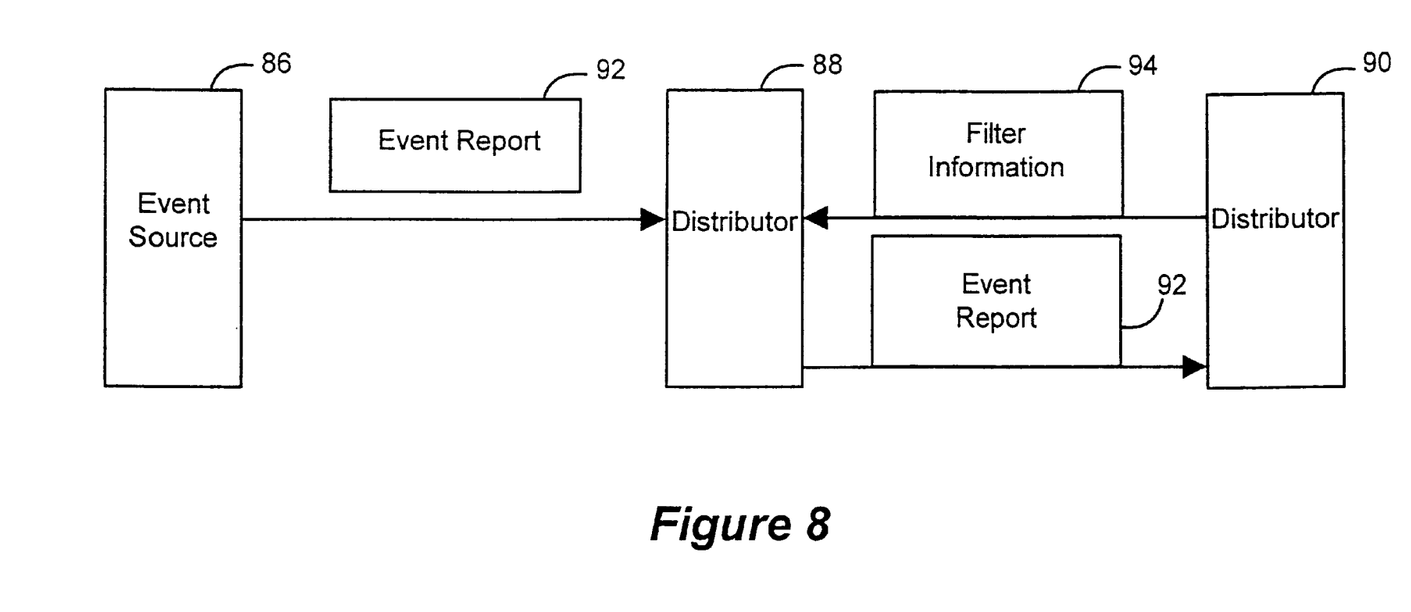
FIG. 8 is a block diagram illustrating propagation of an event report from a first distributor object to a second distributor object in accordance with a preferred embodiment of the present invention.

A distributor object may also be configured to propagate event reports to other distributor objects. FIG. 8 shows an example of a situation in which a distributor object 88 receives an event report 92 from an event source 86 and propagates the event report to a second distributor object 90. The difference between this type of propagation and the propagation that occurs with normal registration is that filtering information 94 stored on the second distributor object 90 is forwarded to the first distributor object 88. This filtering information specifies which type of event report the distributor object 90 is interested in obtaining. The first distributor object 88 filters the incoming event reports 92 to determine whether the second distributor object 90 wishes to receive the event report. The filtering information 94 is stored on the second distributor object in such a way that it is available to any distributor object that is registered to propagate event reports to the second distributor object.

The operating system 20 provides a number of dispatch interfaces. A dispatch interface, in this context, is as defined in the Microsoft Object Linking and Embedding (OLE) 2.0 protocol, established by Microsoft Corporation of Redmond, Wash. Dispatch interfaces allow access to methods, properties and data members of objects whose interface is not known. Each dispatch interface has functions that allow a caller to retrieve and send property values. The event distributor objects have the ability to call any dispatchable interface. Parameter information is stored with the registration information for the event sink object. Properties are set on the software connector to the event sink in the event source such that each registration can have its own interface to be called. As an example, this capability allows a system event to trigger the printing of a word processing document through the call to the unique interface associated with the registration of an event sink.

It should be appreciated that registrations may be maintained over a period of time. Registrations are not strictly a one-time phenomena. The registration need not be deleted after a single event occurs. Maintaining the registration is helpful in performing functions such as logging. Logging involves recording event reports in a file to create a log. The log may be later viewed to provide a historical record of activity of a part of the system.

A preferred embodiment of the present invention enhances the ability of system administration functions to become aware of relevant events within the system. This capability stems, in large part, from segregating the occurrence of an event from the response to the event. The preferred embodiment also facilitates segregation by event type so that the system administrator may be aware of the different types of events and respond accordingly.

Since event reports are objects in the global namespace, both users and system components have access to the event reports. The event reports include important state information that may be used by users and system components alike. The user has the ability to discover what events a program is capable of generating and can register to receive notice of any such events.

While the present invention has been described with reference to a preferred embodiment thereof, those skilled in the art will appreciate that various changes in form and scope may be made without departing from the present invention as defined in the appended claims. For instance, the present invention need not be practiced in a single processor system like that shown in FIG. 1; rather the present invention may also be practiced in a distributed system.

We claim:

1. A method for reporting system management events in a data processing system, comprising:

providing an event source object, the event source object exposing an event source object interface in a global namespace;

providing a plurality of distributor objects, each of said plurality of distributor objects exposing a distributor object interface;

registering the event source object with one or more of said plurality of distributor objects;

registering one or more event sink objects with one or more of said plurality of distributor objects;

generating an event source report at said event source object in response to the detection of an event by said event source object;

transmitting the event source report from the event source object to said distributor objects with which said event source object has registered;

receiving the event source report at said distributor objects with which said event source object has registered; and forwarding said event source report from said distributor objects with which said event source has registered to said event sink objects registered with said distributor objects.

2. The method of claim 1, further comprising:

utilizing said plurality of distributor objects to group a plurality of said event source objects and said event sink objects into a set.

3. The method of claim 2, wherein one of said plurality of distributor objects is utilized to represent a set of administrators on a network domain.

4. The method of claim 3, further comprising:

providing an object definition for each of said event source objects comprising an event set identifying one or more events that the corresponding event source object is capable of generating; and storing each of said object definitions in a storage structure that is separate from the corresponding event source object.

5. The method of claim 4 wherein said storage structure comprises a property set.

6. A computer-readable medium containing computer-executable instructions which, when executed by a computer, perform the method of claim 1.

7. A computer-readable medium containing computer-executable instructions which, when executed by a computer, perform the method of claim 4.

8. A computer-controlled apparatus capable of performing the method of claim 1.

9. A computer-controlled apparatus capable of performing the method of claim 4.

10. A computer-readable medium containing computer-executable instructions which, when executed by a computer, cause the computer to:

provide at least one event source object in a memory means of said computer, said event source object capable of generating an event report in response to the occurrence of an event at the event source object;

provide a first distributor object and a second distributor object in said memory means, said first distributor object serving to distribute said event report to said second distributor object;

make a list of events that said event source object can notify other objects of visible through a global namespace;

access the event source object through the global namespace and register the first distributor object with the event source object to receive said event report from said event source object;

register the second distributor object with the first distributor object through an interface in said global namespace to receive the event report;

register the event sink object with the second distributor object through an interface in the global namespace to receive the event report;

receive a notification of said event at the event source object;

generate an event report at the event source object;

forward the event report to the first distributor object;

provide filtering information from the second distributor object to the first distributor object, said filtering information specifying a type of event report that the second distributor object wishes to receive; and where the filtering information indicates that the second distributor object wishes to receive the event report, forwarding the event report from the first distributor object to the second distributor object.

11. A computer-controlled apparatus capable of performing the method of claim 10.

* * * * *

UNITED STATES PATENT AND TRADEMARK OFFICE
CERTIFICATE OF CORRECTION

PATENT NO. : 6,212,676 B1  
DATED : April 3, 2001  
INVENTOR(S) : M.R.C. Seaman et al.

Page 1 of 1

It is certified that error appears in the above-identified patent and that said Letters Patent is hereby corrected as shown below:

Column 4,  
Line 65, "viable," should read -- vtable, --  
Line 66, "viable 31" should read -- vtable 31 --

Column 5,  
Line 2, "viable 31." should read -- vtable 31. --  
Line 4, "Unknown" should read -- IUnknown --  
Line 45, "DisKEventSet." should read -- DiskEventSet. --

Column 6,  
Line 44, "pconSink→" should read -- pconSink-> --  
Line 47, "pSource→" should read -- pSource-> --  
Line 47, "Queryinterface" should read -- QueryInterface --  
Line 49, "piccSource→" should read -- piccSource-> --  
Line 52, "pconSource→" should read -- pconSource-> --

Signed and Sealed this

Twenty-seventh of November, 2001

Attest:

NICHOLAS P. GODICI  
*Attesting Officer*     *Acting Director of the United States Patent and Trademark Office*